United States Patent
Werst

(10) Patent No.: US 11,046,860 B2
(45) Date of Patent: Jun. 29, 2021

(54) POLYMERIC COMPOSITION COMPRISING SPHERICAL AGGREGATE AND METHOD OF USE THEREOF

(71) Applicant: The Willamette Valley Company LLC, Eugene, OR (US)

(72) Inventor: Nathan E. Werst, Eugene, OR (US)

(73) Assignee: The Willamette Valley Company LLC, Eugene, OR (US)

( * ) Notice: Subject to any disclaimer, the term of this patent is extended or adjusted under 35 U.S.C. 154(b) by 25 days.

(21) Appl. No.: 16/328,316

(22) PCT Filed: Aug. 30, 2017

(86) PCT No.: PCT/US2017/049258
§ 371 (c)(1),
(2) Date: Feb. 26, 2019

(87) PCT Pub. No.: WO2018/044965
PCT Pub. Date: Mar. 8, 2018

(65) Prior Publication Data
US 2019/0194486 A1 Jun. 27, 2019

Related U.S. Application Data

(60) Provisional application No. 62/382,827, filed on Sep. 2, 2016.

(51) Int. Cl.
| | |
|---|---|
| C09D 125/06 | (2006.01) |
| C08G 18/76 | (2006.01) |
| C08L 25/06 | (2006.01) |
| C08L 75/04 | (2006.01) |
| C09D 7/40 | (2018.01) |
| C09D 175/04 | (2006.01) |

(52) U.S. Cl.
CPC ....... *C09D 125/06* (2013.01); *C08G 18/7664* (2013.01); *C08L 25/06* (2013.01); *C08L 75/04* (2013.01); *C09D 7/69* (2018.01); *C09D 7/70* (2018.01); *C09D 175/04* (2013.01); *C08L 2205/18* (2013.01)

(58) Field of Classification Search
CPC .......... C09D 125/06; C09D 7/69; C09D 7/70; C09D 175/04
USPC ........................................................ 524/502
See application file for complete search history.

(56) References Cited

U.S. PATENT DOCUMENTS

| | | | |
|---|---|---|---|
| 3,873,475 A | 3/1975 | Pechacek et al. | |
| 5,254,405 A | 10/1993 | Panaroni et al. | |
| 5,478,596 A | 12/1995 | Gurney | |
| 6,790,880 B2 * | 9/2004 | Purgett | C08G 18/3821 523/172 |
| 7,928,160 B2 | 4/2011 | Senkfor et al. | |
| 2003/0090016 A1 | 5/2003 | Petrovic et al. | |
| 2007/0232733 A1 | 10/2007 | Ziser et al. | |
| 2012/0189389 A1 * | 7/2012 | Hicks | E01C 19/1013 404/82 |

FOREIGN PATENT DOCUMENTS

| | | |
|---|---|---|
| JP | 2002021012 A | 1/2002 |
| JP | 2006214096 A | 8/2006 |

OTHER PUBLICATIONS

International Search Report, dated Nov. 16, 2017, for PCT/US17/49258 filed Aug. 30, 2017.
Supplementary European Search Report, dated Mar. 9, 2020, for EP Application No. 17847422.7 filed Aug. 30, 2017.

* cited by examiner

*Primary Examiner* — Hui H Chin
(74) *Attorney, Agent, or Firm* — Brinks Gilson & Lione

(57) ABSTRACT

A multi-component, chemically-curing, non-cellular, polymeric composition includes a resin component having a resin density, a reactive component having a reactive component density, and an aggregate component having a spherical shape, a diameter of about 0.1 mm to about 10 mm and an aggregate density. The density of the aggregate component is within 2 lbs/gallon of the density of at least one of the resin component or the reactive component.

18 Claims, 1 Drawing Sheet

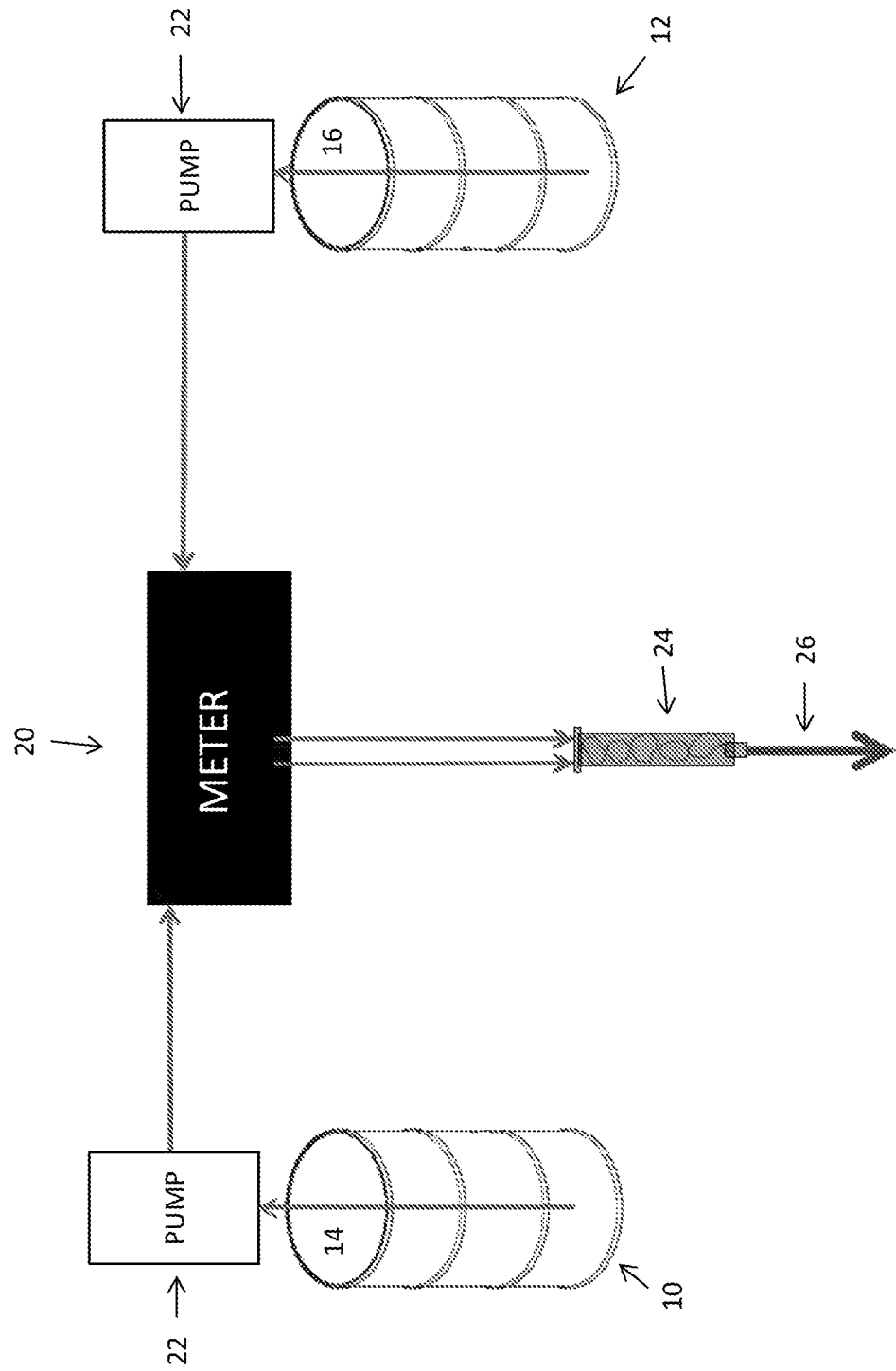

POLYMERIC COMPOSITION COMPRISING SPHERICAL AGGREGATE AND METHOD OF USE THEREOF

CROSS-REFERENCE TO RELATED APPLICATIONS

U.S. Provisional Priority

This application is a National Stage application of International Application No. PCT/US2017/049258, filed Aug. 30, 2017, which claims the benefit of U.S. Provisional Application No. 62/382,827, filed Sep. 2, 2016.

FIELD OF THE INVENTION

The present disclosure generally relates to a polymeric composition for use in repairing damaged surfaces and a method for applying the same. Exemplary surfaces may include pavements, roadways, concrete surfaces, and the like.

BACKGROUND OF THE INVENTION

Polymeric compositions can be used to repair and restore damaged surfaces such as cracked pavement. For example, road repair crews can use polymeric compositions to patch cracks, holes, and the like along a stretch of roadway. Multi-component, chemically-curing, non-cellular, polymeric compositions generally include a mixture of a resin component, a reactive component, and an aggregate component. The components can be mixed together to form the polymeric composition that can be used in repairing damaged surfaces. Once the components are mixed together, the chemically-cured polymeric composition remains pliable or "workable" for a relatively short time, e.g. 45 minutes, before the polymeric composition cures and is no longer pliable. Thus, it is advantageous to use the polymeric composition shortly after mixing of the components in order to take full advantage of the workable life of the composition. As such, it is efficient and effective to mix the components at the site of surface repair to maximize the usable life of the polymeric composition.

Unfortunately, conventional methods of producing polymeric composite materials onsite require the use of mixing equipment, which can be cumbersome, time consuming, and can result in user exposure to undesirable chemicals during mixing. One example of such mixing equipment is a drill with an attachment that is used to mix the resin, the reactive component and the filler in a container such as a bucket.

Another known method for producing polymeric composite material includes mixing the aggregate, the resin and the reactive component in a batch mixer for several minutes until the aggregate is uniformly coated with the combined resin and reactive component before it is set into place (for example, by pouring the polymeric composite material into place). Batch mixing uses bulky and expensive equipment and instrumentation to mix the components. It can be difficult to transport the bulky equipment to more remote locations for surface repairs. Additionally, because of the size of the batch mixing equipment, it can be difficult to have the equipment immediately at the site of repair, thus the polymeric composite materials typically have to be relocated quickly to the site of repair to avoid the polymeric composite material curing and hardening before the repair can be made.

An additional method for repairing a damaged surface using polymeric compositions includes machine dispensing a mixture of resin and reactive components separately from the aggregate component. For the separate application method, the aggregate can be pre-placed into the repair area or can be added at the same time as the mixture of resin and reactive components, but as a separate component. The mixed resin and reactive components need a viscosity that enables the mixture to penetrate, encapsulate, and generally flow around the separately introduced aggregate before curing to create a composite repair material.

The compositions and methods described herein address some of the disadvantages of conventional polymeric composite materials.

BRIEF SUMMARY

In a first aspect of the invention, a multi-component, chemically-curing, non-cellular, polymeric composition comprises a resin component having a resin density, a reactive component having a reactive component density, and an aggregate component. The aggregate component has a spherical shape, a diameter of about 0.1 mm to about 10 mm, and an aggregate density. The density of the aggregate component is within 2 lbs/gallon of the density of at least one of the resin component or the reactive component.

In a feature of the first aspect, the density of the aggregate component is within 1 lbs/gallon of the density of the at least one of the resin component or the reactive component. In another feature, the density of the aggregate component is within 0.5 lbs/gallon of the density of the at least one of the resin component or the reactive component. In a further feature, the density of the aggregate component is within 5% of the density of the at least one of the resin component or the reactive component.

In an additional feature, the diameter of the aggregate component is about 0.3 mm to about 3 mm. In yet another feature, the diameter of the aggregate component is about 0.4 mm to about 1 mm.

In a further feature, a volume ratio of a volume of a combination of the aggregate component and the resin component to a volume of the reactive component is from about 9:1 to 1:9. In an additional feature, the aggregate component comprises about 20% by volume to about 70% percent by volume of a combination of the aggregate component and the resin component. In yet another feature, the aggregate component comprises from about 30% by volume to about 60% percent by volume of the combination of the aggregate component and the resin component. In a further feature, the resin component comprises an epoxy resin, a polyol resin, a polyurethane forming resin, or a polyurea resin. In embodiments, the resin component comprises a polyol resin.

In another aspect of the invention, a method of continuously dispensing a multi-component, chemically-curing, non-cellular polymeric composition to a work area comprises providing a reactive component, a resin component, and an aggregate component, combining the aggregate component with at least one of the reactive component or the resin component to form a filled reference component, delivering a flowing volume of the filled reference component and a flowing volume of the component that was not combined with the aggregate to a mixing device at a fixed volume ratio of the volume of the filled reference component to the volume of the component that was not combined with the aggregate, mixing the flowing volume of the filled reference component with the flowing volume of the non-combined component at the fixed volume ratio in the mixing device to form the multi-component, chemically-curing, non-cellular polymeric composition, and dispensing a flowing volume of the polymeric composition to the work area.

In a feature of this aspect, the aggregate component has an aggregate density that is within 2 lbs/gallon of a density of at least one of the resin component or the reactive component and wherein the filled reference component is formed by combining the aggregate component with the at least one component having a density within 2 lbs/gallon of the aggregate density. In embodiments, the aggregate component is combined with the resin component to form the filled reference component. With regard to this embodiment, the aggregate density is within 1 lb/gallon of the resin component density. With further regard to this embodiment, the aggregate density is within 0.5 lb/gallon of the resin component density.

In another feature of this aspect of the invention, the fixed volume ratio of the volume of the filled reference component to the volume of the non-combined component is from about 9:1 to 1:9. In a further feature of this aspect, the aggregate component has a spherical shape and a diameter of about 0.1 mm to about 10 mm. In still further features of this aspect, the mixing device is a static mix tube, and a metering device is used to achieve the fixed volume ratio.

BRIEF DESCRIPTION OF THE DRAWINGS

FIG. 1 is a schematic representation of the process described in Example 2.

DETAILED DESCRIPTION

A multi-component, chemically-curing, non-cellular, polymeric composition for use as a polymeric repair material and a method of applying the same to an area in need of repair is described herein. As will be described more fully below, the polymeric repair material advantageously can be introduced or applied to a desired area (e.g., a spall in concrete, a trench that needs to be filled and re-instated, or another area) in a way that reduces the labor burden and time required for conventional application methods. The components used in the polymeric composition enable the composition to be continuously pumped, mixed, and delivered to a repair area using readily, commercially available pump, mixing, and delivery devices. Relative speed and ease of delivery of the polymeric composition is advantageous for in field or on-site repair operations.

The polymeric composition comprises a resin component, a reactive component, and an aggregate component. The polymeric composition is a chemically curing composition, such that when the resin component and the reactive component are mixed, the components chemically react to form a polymeric composition that becomes solid over time and can be used to repair damaged surfaces and other areas in need of repair. Generally speaking, the resin component and the reactive component may be in the form of a liquid, solid, or a combination thereof. In preferred embodiments, the resin component and the reactive component are in the form of a liquid. In preparing the polymeric composition, no blowing agent or mechanism for producing gas which would lead to cell development is present. Thus, the polymeric composition is non-cellular. In use, the aggregate component is initially combined with one of the resin component or the reactive component to form a filled resin component or a filled reactive component and then the filled component is mixed with the non-filled component to form the polymeric composition.

In an exemplary embodiment, the aggregate component is mixed with the resin component to form a filled resin component. Then the filled resin component is mixed with the reactive component. The filled resin component can be mixed in varying volumes with the reactive component. Thus, a volume ratio of the volume of filled resin component to the volume of reactive component can vary with application, and may depend on a number of considerations, including, but not limited to, component properties, location of repair area, type of repair being performed, etc. The volume ratio may be from 9:1 filled resin component to reactive component to 1:9 filled resin component to reactive component. Exemplary embodiments may include volume ratios of 4:1, 3:2, and 2:1 filled resin component to reactive component.

Exemplary aggregate materials may include glass, sand, rock, rubber crumb, architectural stone, polystyrene, expanded glass, or combinations thereof. In exemplary embodiments, the aggregate may comprise polystyrene beads. Further, more than one type of material can be used as the aggregate component. The material(s) used for the aggregate component can be chosen based on the performance characteristics and properties that are desired for the final polymeric composition.

The aggregate component has physical properties that enable the filled component and the polymeric composition to flow, be pumped, mixed, and dispensed or applied to an area in need of repair as a homogenous mixture or slurry. The aggregate component is generally spherical in shape. As used herein, the terms "spherical", "sphere", and "round" can be used interchangeably and mean generally shaped like a sphere or generally rounded. The terms do not require a perfectly round geometrical shape but rather encompass a shape that is generally rounded or spherical, without sharp points or edges. The spherical shape aids in flowability and pumpability of the polymeric composition.

The size of the aggregate component can have an effect on flowability and ease of use of the polymeric composite. For example, if the aggregate is too large, the polymeric composition may not mix and homogenize as well as it would if the aggregate were smaller. Additionally, a larger diameter aggregate may have difficulty flowing freely through various dispensing devices, for example, pumping, metering, and mixing devices. If the aggregate is too small, the polymeric composition may experience a thickening effect during preparation and application to an area in need of repair. For example, flowability difficulties due to thickening may be evident during pumping, metering, mixing, and/or dispensing. The aggregate component generally has an average diameter of about 0.1 mm to about 10 mm. In an exemplary embodiment, the aggregate component may have an average diameter of about 0.3 mm to about 3 mm. In a further exemplary embodiment, the aggregate component may have an average diameter of about 0.4 mm to about 1 mm. The aggregate component may also be described as having an average diameter no larger than about 10 mm, 9 mm, 8 mm, 7 mm, 6 mm, 5 mm, 4 mm, 3 mm, 2 mm, or 1 mm and no smaller than about 0.1 mm. The aggregate component may also be described as having an average diameter no larger than about 10 mm and no smaller than about 3 mm, 2 mm, 1 mm, 0.9 mm, 0.8 mm, 0.7 mm, 0.6 mm, 0.5 mm, 0.4 mm, 0.3 mm, 0.2 mm, or 0.1 mm.

It may be difficult to ensure that every individual aggregate particle within the aggregate component has a single diameter value. Thus, the diameter of the aggregate component can be provided in a value range. For example, the aggregate component may have a diameter range of from about 0.5 mm to about 1 mm, from about 1 mm to about 1.5 mm, or from about 0.75 mm to about 1.5 mm.

The combined aggregate and resin or reactive component can be pumped using standard equipment and hoses and dispensed through a proportioning device and mixing device easily and continuously without having flowability and transfer problems.

For the polymeric composition described herein, the selected aggregate and one of the liquid resin or reactive components have a similar density. The similarity in density allows for the mixture of aggregate and resin or reactive components to be homogeneous such that the aggregate does not settle or float relative to the liquid resin or reactive component. The similar 'in-situ' density of the aggregate is based on the intrinsic properties of the selected aggregate and the design of either the liquid resin or reactive component. For example, the aggregate may be polystyrene beads with an in-situ density of 9.0 to 9.2 lbs/gallon, and the resin component may have a density of 9.1 to 9.2 lbs/gallon.

The 'in-situ' density refers to the weight per volume ratio of the aggregate, excluding the void space between each individual particle that would otherwise be included in the measured bulk density of the aggregate. The 'in-situ' density of the aggregate can be measured using a volume displacement method for a known mass of aggregate placed into the liquid resin or reactive component. The density of the liquid resin or reactive component can be easily measured by any density method typically used for liquids. For example, a method using a calibrated stainless steel weight per gallon cup from the Paul N. Gardner Company could be used. The aggregate component should have an 'in-situ' density that is similar to the density of the component in which it is initially placed (the resin component or the reactive component). For example, when making the polymeric composition, if the aggregate component is mixed with the resin component first, the in-situ density of the aggregate component should be similar to the density of the resin component. Alternatively, if the aggregate component is mixed with the reactive component first, then the density of the aggregate component should be similar to the density of the reactive component. In embodiments, the densities of the resin component, reactive component, and aggregate component may all be similar to one another.

The term "similar density" as used herein means that the aggregate component has an in-situ density within at least about 2 lbs per gallon, more preferably within at least about 1 pound per gallon of the density of the material with which it has a similar density (the "reference material"). One of the resin component or the reactive component will be the reference material. Further, the reference material is the component with which the aggregate component is mixed first, prior to being mixed with the non-reference material.

The term similar density encompasses a density within about 2 lbs/gallon of the density of the reference material to a density that is negligibly different from the density of the reference material. For example, a similar density may be within 1.5 lbs/gallon, 1.0 lbs/gallon, 0.9 lbs/gallon, 0.8 lbs/gallon, 0.7 lbs/gallon, 0.6 lbs/gallon, 0.5 lbs/gallon, 0.4 lbs/gallon, 0.3 lbs/gallon, 0.2 lbs/gallon, and 0.1 lbs/gallon of the density of the reference material. It will be understood that a similar density can include a density that is greater than or less than the density of the reference material, as long as it is within 2 lbs/gallon of the density of the reference material. Further, the term "similar density" may also include a density that is within 10% of the density of the reference material. For example, the density may be within 9%, 8%, 7%, 6%, 5%, 4%, 3%, 2%, or 1% of the density of the reference material.

The aggregate component may have an in-situ density in a range of about 7 lbs/gallon to about 25 lbs/gallon, for example in a range of about 9 lbs/gallon to about 12 lbs/gallon. In examples, the aggregate may have a density of at least about 7 lbs/gallon, at least about 8 lbs/gallon, at least about 9 lbs/gallon, at least about 10 lbs/gallon, at least about 11 lbs/gallon, at least about 12 lbs/gallon, at least about 13 lbs/gallon, at least about 14 lbs/gallon, at least about 15 lbs/gallon, or at least about 20 lbs/gallon. In other examples, the aggregate may have a density in a range of at most about 20 lbs/gallon, at most about 15 lbs/gallon, at most about 14 lbs/gallon, at most about 13 lbs/gallon, at most about 12 lbs/gallon, at most about 11 lbs/gallon, at most about 10 lbs/gallon, at most about 9 lbs/gallon, at most about 8 lbs/gallon, or at most about 7 lbs/gallon. Low density fillers may also be used. A low density filler may have a density in the range of about 15 to 55 lb/ft$^3$.

The term "in-situ" refers to the density of the aggregate in the reference material. The term "in-situ" is used to differentiate the bulk density of the aggregate from the density of the aggregate in a liquid material. Herein, the liquid material is the reference material. The "in-situ" density excludes the void space that is present when dry aggregate particles are collectively measured. For example, the bulk density of a volume of dry beads can be measured in a container. The bulk density of the dry beads will be less than the density of the beads measured when the beads are mixed with a liquid because the void space filled with air that surrounds each individual bead particle is not present when the density is measured in a liquid. The "in-situ" density does not include the air space around the individual particles of aggregate.

The aggregate component can be combined with the reference material (one of the resin component or the reactive component) in varying amounts. For example, the aggregate component may comprise up to 70 volume % of the mixture of the aggregate component and the reference material (the "filled mixture"). For example, the volume % of aggregate material may be up to 70%, 60%, 50%, 40%, 30%, 20%, 10%, 5%, and 1%. The volume percent of aggregate in the filled mixture may be between about 25-55 volume %. The volume or loading percent of aggregate component may depend on the requirements of the application and/or the characteristics of the aggregate component itself. The volume or loading percent of the aggregate component can affect performance characteristics of the filled mixture and the polymeric composition. If the loading of aggregate is too high, the filled mixture and/or polymeric composition may not have the flow characteristics that enable pumping with standard, commercially available equipment. For example, the polymeric composition may be too thick to flow readily. It is desirable to load the aggregate component as high as possible to minimize cost (assuming the aggregate component is less expensive than the surrounding material) while maintaining flowability. Additionally, the percentage of the composition that is comprised of aggregate component can be adjusted based on the desired characteristics of the filled mixture and also the final polymeric composition.

Different types of resin components may be used to form the polymeric composite material. For example, an epoxy resin or a polyol resin may be used. If a polyol resin is used, the reactive component that reacts with the resin may be an isocyanate containing compound, and the resulting polymeric composite material is a polyurethane. Alternatively, if an epoxy resin is used, the reactive component that reacts with the resin may be a hardener, such as a polyamine or polyamide, and the resulting polymeric composite material is an epoxy.

The resin component and the reactive component may be present in amounts that allow a complete reaction therebetween. The ratio of the resin component to the reactive component may be determined based on a number of considerations, including, but not limited to, the components being mixed to form to the polymeric composition, the type and size of the area being repaired, the expected in-service conditions, performance criteria determined by engineers or other highway/DOT specifications, the desired flowability of the polymeric composition, and environmental conditions such as ambient temperature, humidity, etc.

The resin component may also include a chain extender, a molecular sieve, a wetting or dispersing agent, defoamer, a rheology modifier, catalyst, micro-balloons, compatibilizers, thixotropes, pigments, diluents, and anti-settling agents.

As stated above, different resins can be used to form different types of polymeric composite materials. The resin component may be an epoxy resin, a polyol resin, a polyurea resin, or a combination thereof. A polyol resin may include a polyol with a hydroxyl-terminated backbone of a member selected from the group consisting of polyether, polyester, polycarbon, polydiene, and polycaprolactone. A polyol resin component may comprise a single polyol or a mixture of polyols. For example, the polyol resin component may contain one polyol, two polyols, three polyols, or four or more polyols. In embodiments, the resin component may comprise a mixture of two or three polyols.

Polyols used in the resin component typically have a number average molecular weight from about 50 to about 8000. When employing a mixture of polyols, the various polyols of the mixture may have differing molecular weights. For example, a mixture of two polyols may include one polyol having a relatively lower molecular weight (e.g., about 500-1000 MW) and one polyol having a relatively higher molecular weight (e.g., about 2500-3500 MW). An exemplary mixture of three polyols may employ three polyols having differing molecular weights. For example, one polyol may have a molecular weight of about 400-500, the second may have a molecular weight of about 650-750, and the third may have a molecular weight of about 2500-3500. Polyol mixtures may also include a mixture of types of polyols. For example, a mixture of two polyols may include 2 diols, 2 triols, 1 diol and 1 triol, or a mixture of other types of polyols.

Useful polyols may include polyethers, polyesteramides, polythioethers, polycarbonates, polyacetals, polyolefins, polysiloxanes, various grades of caster oils, hydroxy-terminated prepolymers. For example, suitable polyols may include a polyol selected from the group consisting of a polyol with a hydroxyl-terminated backbone of a member selected from the group consisting of polyether, polyester, polycarbon, polydiene, and polycaprolactone; hydroxyl-terminated polyhydrocarbons, hydroxyl-terminated polyformals, fatty acid triglycerides, hydroxyl-terminated polyesters, hydroxymethyl-terminated polyesters, hydroxymethyl-terminated perfluoromethylenes, polyalkyleneether glycols, polyalkylenearyleneether glycols, polyalkyleneether triols, adipic acid-ethylene glycol polyester, polybutylene glycol, polypropylene glycol and hydroxyl-terminated polybutadiene. The polyol resin may also include adipic acid-ethylene glycol polyester, polybutylene glycol, polypropylene glycol or hydroxyl-terminated polybutadiene. In an exemplary embodiment, the resin is polypropylene glycol. The aforementioned list of polyols is representative of the resins that may be used. However, the polyol suitable for use is not particularly restricted. U.S. Pat. No. 6,635,737, hereby incorporated by reference in its entirety, provides additional polyols that may be used.

The resin may also be a polyurea resin that includes compounds with hydrogen bonded to nitrogen. The polyurea resin may include a polyamine, a polyamide, a polyimine, a polyolamine, or a combination thereof.

The resin may be an epoxy resin comprising a low molecular weight pre-polymer or higher molecular weight polymers containing at least two epoxide groups. The epoxy resin may include diglycidyl ethers of bisphenol A, diglycidyl ethers of bisphenol F, epoxidised novolacs, aliphatic epoxy resins, and glycidylamine epoxy resins.

The resin may have a density in the range of about 5 lbs./gallon to about 25 lbs./gallon, preferably in a range of about 8 lbs./gallon to about 10 lbs./gallon. In some examples, the resin has a density of at least about 5 lbs./gallon, at least about 6 lbs./gallon, at least about 7 lbs./gallon, at least about 8 lbs./gallon, at least about 9 lbs./gallon, at least about 10 lbs./gallon, at least about 11 lbs./gallon, at least about 12 lbs./gallon, or at least about 13 lbs. gallon. In some examples, the resin has a density of at most about 25 lbs./gallon, at most about 20 lbs./gallon, at most about 15 lbs./gallon, at most about 10 lbs./gallon, at most about 9 lbs./gallon, at most about 8 lbs./gallon, at most about 7 lbs./gallon, at most about 6 lbs./gallon, or at most about 5 lbs./gallon.

As indicated above, the reactive component used in the polymeric composition may be dependent on the type of resin component used. For example, an isocyanate containing compound can be reacted with a polyol resin to form a polyurethane composite material. The isocyanate containing compound should have at least one isocyanate functional group. The functional group may be an aliphatic isocyanate, a cycloaliphatic isocyanate, an aryl isocyanate, an aromatic cyanate, or a combination thereof. The functional group may be 1,6-hexamethylene diisocyanate, 1,4-butylene diisocyanate, furfurylidene diisocyanate, 2,4-toluene diisocyanate, 2,6-toluene diisocyanate, 2,4'-diphenylethane, diisocyanate, 4,4'-diphenylmethane diisocyanate, 4,4'-diphenylpropane diisocyanate, 4,4'-diphenyl-3,3'-dimethyl methane diisocyanate, 1,5-naphthalene diisocyanate, 1-methyl-2,4-diisocyanate-5-chlorobenze, 2,4-diisocyanate-s-triazine, 1-methyl-2,4-diisocyanato cyclohexane, p-phenylene diisocyanate, dianisidine diisocyanate, bitolylene diisocyanate, 1,4-xylylene diisocyanate, 1,3-xylylene diisocyanate, bis-(4-isocyanatophenyl)methane, bis-(3-methyl-4-isocyanatophenyl) methane, polymethylene polyphenyl polyisocyanates or a combination thereof. In an exemplary embodiment, the preferred isocyanate functional group may be polymethylene polyphenyl polyisocyanates. The aforementioned list of isocyanate functional groups is representative of the isocyanate functional groups that may be used. However, the isocyanate functional groups suitable for use are not particularly restricted. U.S. Pat. No. 5,422,385, hereby incorporated by reference in its entirety, provides additional isocyanates that may be used.

In an exemplary embodiment wherein the resin component is an epoxy resin, the reactive component may be a hardener or a curative. The reaction between the epoxy resin and the hardener may also be referred to as curing. Exemplary hardeners include polyfunctional amines, acids (and acid anhydrides), phenols, alcohols and thiols.

The reactive component may have a density in the range of about 5 lbs./gallon to about 25 lbs./gallon, preferably in a range of about 8 lbs./gallon to about 10 lbs./gallon. In some examples, the reactive component may have a density of at least about 5 lbs./gallon, at least about 6 lbs./gallon, at least about 7 lbs./gallon, at least about 8 lbs./gallon, at least about 9 lbs./gallon, at least about 10 lbs./gallon, at least about 11 lbs./gallon, at least about 12 lbs./gallon, or at least about 13 lbs. gallon. In some examples, the reactive component has a density of at most about 25 lbs./gallon, at most about 20 lbs./gallon, at most about 15 lbs./gallon, at most about 10 lbs./gallon, at most about 9 lbs./gallon, at most about 8 lbs./gallon, at most about 7 lbs./gallon, at most about 6 lbs./gallon, or at most about 5 lbs./gallon. In an exemplary embodiment, the reactive component may preferably have a density of about 9 lbs./gallon.

A catalyst may be used to accelerate the reaction between the resin component and the reactive component. The catalyst may include amine compounds and metal-based compounds. Exemplary metal compounds may be based on tin, mercury, lead, bismuth, and zinc. Exemplary amine compounds may include tertiary amines such as triethylenediamine (TEDA), dimethylcyclohexylamine (DMCHA), and dimethylethanolamine (DMEA).

The polymeric composition can be used to repair damage to areas in need of repair. Exemplary repair areas may include a spall in concrete, a trench that needs to be filled and re-instated, and the like. Advantageously, because of the physical characteristics of the polymeric composition, the composition can be pumped, metered, mixed, and dispensed to the repair area on a continuous basis using commercially available equipment. This ease of application makes the polymeric composition ideal for on-site repairs.

Conventional application methods for currently available polymeric composite materials are relatively labor and time intensive. In one application method, batch mixing is used to combine all of the components of a polymeric composite material (e.g., resin component, reactive component, and aggregate component) in a single container or sequential containers to form the polymeric composite material. Then the polymeric composite material is dispensed to or into an area in need of repair (e.g., area to be filled, repaired, and/or reinstated). For batch mixing, typically the components are mixed in pails, grout buckets, totes, drums or other mixing containers. After the mixing is completed and the polymeric composite material has formed but not yet hardened, the material is hand poured from the batch mixing container to the area in need of repair. Batch mixing operations are relatively slow and time intensive operations because of the non-continuous nature of the mixing process. In another application method, the aggregate can be pre-placed into the repair area and then a liquid material comprising a mixture of a resin component and a reactive component can be dispensed over the aggregate in order to penetrate, encapsulate, and generally flow around the pre-placed aggregate before curing to create a composite repair material. The mixed liquid material should have a viscosity that allows it to flow around the pre-placed aggregate in order to form the composite repair material. Similarly, rather than the aggregate being pre-placed, it can be dispensed as a separate component at the same time as the liquid material. In either scenario, the aggregate component is introduced to the repair area separately from the mixed liquid material.

In contrast, the polymeric composition described herein can be applied without having to batch mix all of the components prior to application or having to introduce mixed liquid material separately from the aggregate component. In fact, the polymeric composition described herein can flow easily and be pumped like a liquid through standard metering equipment and standard mixing devices, such as a static mix tube.

The multi-component, chemically-curing, non-cellular polymeric composition described herein can be dispensed to a work area using a method that is less labor and time intensive than currently available methods. In the present method, a reactive component, a resin component, and an aggregate component are provided. Then, the aggregate component is combined with at least one of the reactive component or the resin component to form a filled reference component. As described above, at least one of the reactive component or the resin component has a density that is similar to the density of the aggregate. The component having the similar density is the reference material. The aggregate component is combined with the reference material to form the filled reference component. The aggregate component and the reference material can be combined in a standard bulk liquid container, such as, for example, a tote, drum, pail, etc. If both the reactive component and the resin component have a density similar to the density of the aggregate, one of the two components is combined with the aggregate and that component is the reference material. The component that is not the reference material and is not combined with the aggregate initially is the non-combined component. The non-combined component can also be held in a separate bulk liquid container.

A flowing volume of the filled reference component and a flowing volume of the non-combined component can be delivered from the containers in which they are held to a mixing device at a fixed volume ratio of the flowing volume of the filled reference component to the flowing volume of non-combined component. Delivery of the components to the mixing device can be performed on a continuous basis using standard, commercially available pumping devices. Exemplary pumps include, for example, positive rod displacement, piston displacement, double acting piston, and diaphragm pump. A meter can be used to establish and maintain the fixed volume ratio of the flowing components. Exemplary meters include, but are not limited to, a precision gear meter and a dual reciprocating piston meter. As discussed above, the fixed volume ratio for use in a particular repair operation can be determined based on physical characteristics of the components, application location, type of repair being performed, and additional factors. The volume ratio may range from 9:1 filled reference component to non-combined component to 1:9 filled reference component to non-combined component. Exemplary fixed volume ratios include, without limitation, 4:1, 3:1, 2:1, and 1:1 volume of the filled reference component to volume of non-combined component.

The filled reference component is mixed with the non-combined component at the fixed volume ratio in the mixing device to form the multi-component, chemically-curing, non-cellular polymeric composition. A static mix tube can be used as the mixing device. A static mix tube advantageously enables continuous mixing of the flowing volume of filled reference component with flowing volume of the non-combined component thereby forming the multi-component, chemically-curing, non-cellular polymeric composition. The polymeric composition can be continuously dispensed to the work area. The flowing polymeric composition may be directly dispensed from the static mix tube.

EXAMPLES

Example 1. An exemplary polymeric composition is a polymeric urethane. In the following example, a polymeric urethane was formed and dispensed.

The aggregate was composed of general purpose polystyrene beads having diameters between 0.5 and 1.0 mm. The polystyrene beads were combined with the resin component in a 55 gallon open top drum using a single shaft dispersion mixer with a high shear disk shaped mix blade approximately ⅓ diameter of the drum. The resin component comprised a blend of medium and high molecular weight polyfunctional alcohols, a chain extender, fillers and pigments, moisture scavengers, a wetting/dispersing additive and a catalyst. The polystyrene beads comprised 30-40 wt % of the combined aggregate and resin. The density of the polystyrene beads was 9.1-9.2 lbs/gal in the resin component. The resin component had a density of 9.1-9.2 lbs/gal. Thus the density of the aggregate and the density of the resin were both 9.1-9.2 lbs/gal. The combined polystyrene beads and resin were held in a 55 gallon open top drum, and an isocyanate component was also held in a similar container. The combined polystyrene beads and resin and the isocyanate were pumped from their respective containers by standard dual cylinder and/or diaphragm pumps. A metering system using a fixed volume dual cylinder proportioner was used to deliver the components at a fixed volume ratio of 4:1 (combined polystyrene beads and resin: isocyanate component) to a static mix tube on the end of a dispensing apparatus. The components were mixed in the static mix tube to form a polymeric urethane and then dispensed into the desired application area for hardening.

Example 2. In the following example, another exemplary polymeric urethane was formed and dispensed. FIG. 1 provides a schematic representation of some of the equipment used for formation and dispensing of the polymeric composition.

The liquid components of the resin, including a blend of medium and high molecular weight polyfunctional alcohols, chain extender, wetting and dispersing additives and degassing additives were added to a 55 gallon drum 10 and mixed with a single shaft high shear mix blade to create a homogeneous mixture. After the liquids were mixed, the powder or solid components of the resin, including thickener, filler, molecular sieve moisture scavenger, pigments/colorants, and catalyst were added to the drum 10.

The dry components were mixed with the homogenous liquid mixture until fully dispersed. After a homogeneous liquid resin mixture was created, 140-200 lbs of 0.4-1.0 mm polystyrene beads were added to the mixing drum 10 and mixed until the aggregate particles were uniformly dispersed throughout the resin to form a resin and polystyrene bead mixture 14. The polystyrene beads comprised 30-60 wt % of the resin and polystyrene bead mixture 14.

The resin and polystyrene bead mixture 14 was connected to the metering/dispensing system 20. Polymeric MDI isocyanate 16, held in a separate bulk container 12, was also connected to the metering/dispensing system 20. The metering/dispensing system 20 combined the mixed resin and polystyrene bead component 14 with the MDI isocyanate component 16 using a volumetric ratio of 4 parts resin and polystyrene beads to 1 part MDI isocyanate.

The bulk containers 10, 12 were connected to the metering/dispensing system 20 using a thistle tube and appropriate pumps 22. A static mix tube 24 was attached to the end of the metering and dispensing system 20 to provide mixing of the resin/polystyrene bead component 14 and the isocyanate component 16 to create the urethane composite 26. Specifically, an output of 3-4 gallons per minute of mixed urethane repair composite 26 was achieved using a diaphragm pump for the resin/aggregate side, a piston pump for the isocyanate side, and a total hose length of about 40 feet. Hoses were ¾ inch for the resin/polystyrene bead component and ⅜ inch for the isocyanate. The meter was driven by hydraulic pressure, and the material pumps were driven by air pressure.

The invention claimed is:

1. A multi-component, chemically-curing, non-cellular, polymeric composition comprising
   a resin component having a resin density,
   a reactive component having a reactive component density,
   an aggregate component having a spherical shape, a diameter of about 0.1 mm to about 10 mm and an aggregate in-situ density, wherein the in-situ density of the aggregate component is within 2 lbs/gallon of the density of at least one of the resin component or the reactive component,
   wherein the resin component comprises an epoxy resin, a polyol resin, a polyurethane forming resin, or a polyurea resin.

2. The polymeric composition of claim 1, wherein the in-situ density of the aggregate component is within 1 lbs/gallon of the density of the at least one of the resin component or the reactive component.

3. The polymeric composition of claim 2, wherein the in-situ density of the aggregate component is within 0.5 lbs/gallon of the density of the at least one of the resin component or the reactive component.

4. The polymeric composition of claim 1, wherein the in-situ density of the aggregate component is within 5% of the density of the at least one of the resin component or the reactive component.

5. The polymeric composition of claim 1, wherein the diameter of the aggregate component is about 0.3 mm to about 3 mm.

6. The polymeric composition of claim 5, wherein the diameter of the aggregate component is about 0.4 mm to about 1 mm.

7. The polymeric composition of claim 1, wherein a volume ratio of a volume of a combination of the aggregate component and the resin component to a volume of the reactive component is from 9:1 to 1:9 volume of combined aggregate component and resin component to volume of reactive component.

8. The polymeric composition of claim 1, wherein the aggregate component comprises about 20% by volume to about 70% by volume of a combination of the aggregate component and the resin component.

9. The polymeric composition of claim 8, wherein the aggregate component comprises from about 30% by volume to about 60% by volume of the combination of the aggregate component and the resin component.

10. The polymeric composition of claim 1, wherein the resin component comprises a polyol resin.

11. A method of continuously dispensing a multi-component, chemically-curing, non-cellular polymeric composition to a work area, the method comprising
    providing a reactive component, a resin component, and an aggregate component,
    combining the aggregate component with at least one of the reactive component or the resin component to form a filled reference component,
    delivering a flowing volume of the filled reference component and a flowing volume of the component that was not combined with the aggregate to a mixing device at a fixed volume ratio of the volume of the filled reference component to the volume of the component that was not combined with the aggregate, mixing the flowing volume of the filled reference component with the flowing volume of the non-combined component at the fixed volume ratio in the mixing device to form the multi-component, chemically-curing, non-cellular polymeric composition, and dispensing a flowing volume of the polymeric composition to the work area, wherein the aggregate component has an aggregate in-situ density that is within 2 lbs/gallon of a density of at least one of the resin component or the reactive component and wherein the filled reference component is formed by combining the aggregate component with the at least one of the resin component or the reactive component having a density within 2 lbs/gallon of the aggregate in-situ density.

12. The method of claim 11, wherein the aggregate component is combined with the resin component to form the filled reference component.

13. The method of claim 12, wherein the aggregate in-situ density is within 1 lb/gallon of the resin component density.

14. The method of claim 13, wherein the aggregate in-situ density is within 0.5 lb/gallon of the resin component density.

15. The method of claim 11, wherein the fixed volume ratio of the volume of the filled reference component to the volume of the non-combined component is from 9:1 to 1:9 volume of filled reference component to volume of non-combined component.

16. The method of claim 11, wherein the aggregate component has a spherical shape and a diameter of about 0.1 mm to about 10 mm.

17. The method of claim 11, wherein the mixing device is a static mix tube.

18. The method of claim 11, wherein a metering device is used to achieve the fixed volume ratio.

* * * * *